United States Patent Office 3,077,463
Patented Feb. 12, 1963

3,077,463
2-MERCAPTO THIAZOLINE ACCELERATOR IN FILLED POLYESTER RESINS
Wolfgang C. Forster, Elizabeth, and Alvaro Salgado, Union N.J., assignors to Reichhold Chemicals, Inc., White Plains, N.Y.
No Drawing. Filed Nov. 2, 1959, Ser. No. 850,045
11 Claims. (Cl. 260—40)

This invention relates to improved stable resin compositions that may contain pigments and, more particularly comprise blends of polymerizable monomers and unsaturated polyesters containing a promoter which imparts uniform gelling and curing characteristics.

There has been an urgent need for such a promoted resin in a variety of applications, one of the most important being the manufacture of flat and corrugated sheets from resin-impregnated fiberglass. Usually it is not too difficult to make such sheets from a clear resin. Pigmented resins, however present many problems, since most of the pigments exert a retarding influence on the gel time of the resin, resulting not only in slowing down production but also in causing the resin to leak out of the molds. Although a great number of promoters have been disclosed in the literature, they are not suitable in these particular cases for many reasons. For example, known promoters, such as cobalt and iron salts, amines, mercaptans, quaternary ammonium salts, etc., cause discoloration of the pigmented resin and irregular gel times which vary considerably from pigment to pigment.

One object of the invention is to impart uniform gelling characteristics to these polymerizable compositions which may or may not be pigmented.

Another object is to provide stable, clear or pigmented compositions which can be hardened to copolymers without color degradation.

These and other objects of the invention will be apparent from the following specification and the claims appended thereto.

It has been discovered that these objects can be attained by promoting copolymerizable compositions of polymerizable ethylenically unsaturated monomers and unsaturated polyesters of dihydric alcohols and alpha-beta ethylenically unsaturated dicarboxylic acids with a small promoting amount of 2-mercapto thiazoline. Effective amounts of 2-mercapto thiazoline are between about 0.001 to about 0.1 percent. It is generally preferred, however, to use the 2-mercapto thiazoline in amounts between about 0.1 and about 0.05 percent. One method of dispersing the promoter uniformly is to dissolve it in an inert solvent, such as diethylene glycol, before mixing it into the resin.

It was further found that 2-mercapto thiazoline plays a unique role in contrast to similar compounds. Compounds of similar structure, such as mercapto quinazoline, thiourea and thioguanidines are not suitable, because they either tend to discolor the polymers, or impart poor storage stability, or do not give uniform gelling behavior in pigmented resins. The 2-mercapto thiazoline is a well-known accelerator in the vulcanization of rubber which application, however, is outside the scope of this invention.

The use of 2-mercapto thiazoline as a promoter for unsaturated polyester resins has been found to be particularly useful for the continuous manufacture of pigmented corrugated sheets and pigmented finishing rods. Non-promoted pigmented resins gelled and cured so slowly that the laminated articles made therefrom were in a stage of under-cure. Such under-cured articles thereby exhibit cracking on bending, poor weatherability, and so on. We have found that the use of 2-mercapto thiazoline in unsaturated polyester resins overcomes these problems and yields products which are free of such defects.

The unsaturated polyester resins of the present invention are conventional materials described in the prior art. They are usually made by esterifying, at elevated temperatures, dihydric alcohols and alpha-beta ethylenically unsaturated dicarboxylic acids until an acid number of about between 5 and 80, and, preferably, between 20 and 50 is reached, whereupon the resultant alkyd is blended with a stabilizer and a polymerizable monomer having at least one $>C=CH_2$ group. The weight ratio of the alkyd to the monomer may be varied between 95:5 and 5:95. In order to facilitate handling of the resins for such uses as in casting and molding, it is generally preferred to use such a ratio that a syrupy resin blend results. Depending upon the kind of monomer and upon the behavior of the alkyd, the preferred weight ratio is generally between about 55 alkyd to about 45 monomer and about 85 alkyd to about 15 monomer.

The said dihydric alcohols considered as starting materials or as reactants for this esterification reaction include saturated and unsaturated aliphatic glycols, such as ethylene glycol, propylene glycol-1,2, propylene glycol-1,3, butylene glycol-1,2, butylene glycol-1,4, pentane diol-1,5, the hexylene glycols, neopentyl glycol, 2-butene-1,4 diol, 2-methyl-3-butyn-2-ol, 3-methyl-1-pentyn-3-ol, etc. They also include dihydroxy polyethers, such as diethylene glycol, dipropylene glycol, triethylene glycol and also the higher polyglycols of waxy consistency, which latter are called commercially "Carbowaxes." "Carbowax" is a trademark of the Union Carbide and Carbon Corp., 30 E. 42nd St., New York 17, New York, for polyethylene glycols and methoxypolyethylene glycols. "Carbowax" polyethylene glycols are available in molecular weights ranging from 200 to 20,000 and "Carbowax" methoxypoly-ethylene glycols are available in molecular weights of 350, 550 and 750. (See Reinhold, page 227.) Also, cyclo-aliphatic diols, such as 1,1-isopropylidene dicyclohexanol (hydrogenated bisphenol) may be utilized. The ethylenically unsaturated alpha-beta dicarboxylic acids employed in obtaining the unsaturated polyesters include maleic acid, fumaric acid, aconitic acid, itaconic acid, mono chloro-maleic acid, etc., and the corresponding anhydrides of the cis-acids. These ethylenically unsaturated dicarboxylic acids may be partially replaced with either saturated carboxylic acids or those dicarboxylic acids which contain only benzenoid unsaturation. This group includes adipic acid, azelaic acid, sebacic acid, demerized fat acids, orthophthalic acid, isophthalic acid, terephthalic acid, tetrahydrophathalic acid, hexahydrophthalic acid, etc., as well as the anhydrides of those acids which are capable of forming it. Up to 10 mols of these dicarboxylic acids having no ethylenic unsaturation may be used per each mol of ethylenically unsaturated dicarboxylic acid. The preferred mol ratio of ethylenically unsaturated dicarboxylic acid to dicarboxylic acid containing no unsaturation other than benzenoid is between about 5:1 and 1:5.

The group of polymerizable monomers includes the vinyl monomers, such as styrene, vinyl toluene, diallyl phthalate, triallyl cyanurate, trially citrate, diallyl maleate, dially fumarate, the isomers of dichlorostyrene, etc. It further includes acrylic compounds such as methyl methacrylate, ethyl ethacrylate, methyl acrylate, ethyl acrylate, etc.

Pigments used to color these resin compositions may be either organic or inorganic. Although principally all pigments are equally suited, those which are resistant to the acidic polyester resins and, above all, those which show maximum color fastness to sunlight and weathering, are generally preferred. These include titanium dioxide, cadmium sulfide, lead chromate, Phthalocyanine Blue, Phthalocyanine Green, and the like. To obtain uniform dispersion, it is preferred to use the commercially available pastes containing said pigments.

The amount of pigment employed in pigmented resin varies over wide ranges. Primarily, the amount depends upon the desired color effect. Usually, about 5% of dry pigment is sufficient for many applications. If some translucency is desired, amounts of between about 0.001 and about 0.1 percent are suitable. In general, a range of between about 0.002 and about 0.7 percent is preferred.

It is to be understood that the compositions of matter of the present invention may also contain other known additives. It has been found, for instance, that small amounts of copper salts, such as copper naphthenate, helped to get even more uniform gel rates without having a detrimental influence on the color.

RESIN PREPARATION

Although not constituting the present invention itself, a conventional resin preparation is given below for the purpose of specifically identifying the resin used in comparative tests which follow that illustrate outstanding properties of the additive of the present invention.

To a one-liter round-bottom, three-necked flask fitted with agitator, a carbon dioxide sparge tube, and an outlet was charged:

296 grams of phthalic anhydride (2.0 mols)
98 grams of maleic anhydride (1.0 mol), and
251 grams of 1,2-propylene gylcol (3.3 mols).

The mixture was heated slowly, with agitation, under a carbon dioxide atmosphere to thereby drive off reaction water until a top temperature of 210° C. was reached in the course of eight hours. The flask temperature was maintained at about 210° C. until the acid number dropped below 40. The yield was 549 grams of polyester alkyd resin.

The hot alkyd was cooled to 190° C., whereupon 0.062 gram of hydroquinone was added as a stabilizing inhibitor. The alkyd was further cooled to 160° and then poured slowly, with good agitation, into a beaker containing 235 grams of styrene and 0.040 gram of tertiary butyl catechol, which is also a stabilizing inhibitor. The beaker was cooled externally to prevent the temperature of the mixture from rising higher than 70° C. The yield was 784 grams of resin.

INFLUENCE OF 2-MERCAPTO THIAZOLINE ON POLYESTER RESINS (1) Since storage stability is one of the basic requirements of polyester resins, an accelerated test was employed utilizing an elevated temperature. A 100-gram resin sample was placed in a four-ounce glass jar. The jar was put into an oven heated to 55° C. and the storage stability time was ascertained, its end being indicated by the occurrence of gelled particles or even gellation throughout.

This accelerated test has proven to be very useful in reflecting the storage stability of a resin at room temperature. It was experienced that resins having a storage stability at 55° C. for one week or longer were stable for more than six months at room temperature.

The storage stability of resin containing 2-mercapto thiazoline was tested and compared with similarly promoted resins. Since it is generally preferred to have promoted resin available rather than adding the promoter just before the resin is used, good storage stability of the promoted resin is a basic requirement.

The effect of 2-mercapto thiazoline and similar promoters on the storage stability of the resin described above was compiled in Table I (below). Since most of the promoters dissolved very slowly in the resin, they were added in the form of a 10 percent solution in diethylene glycol.

Table I

STORAGE STABILITY OF RESINS

Sample:                                 Storage stability at 55° C., days

Blank _____ 23
Resin containing 0.02% 2-mercapto thiazoline__ 20
Resin containing 0.02%* ethylene thiourea____ 32
Resin containing 0.02% dibutyl thiourea_____ 18
Resin containing 0.02% 2-amino benzenethiol___ ½

*Ethylene thiourea shows a very poor compatibility with resins. On standing at room temperature, resins containing that compound tend to get cloudy and precipitate.

Table I shows that a resin promoted with 2-mercapto thiazoline has a very good storage stability at 55° C. This time period corresponds to at least one year stability at room temperature. The Table I further shows that 2-amino benzenethiol imparts very poor storage stability and that ethylene thiourea, due to its poor compatibility, tends to precipitate from a resin.

(2) The following Table II shows the promoter effect of 2-mercapto thiazoline compared with similar additives at an elevated temperature. The resin as described under "Resin Preparation" above, was used in admixture with 0.5% of benzoyl peroxide and 0.5% of cumene hydroperoxide as catalysts.

The following procedure was employed. For the determination of the gel time, a test tube, 12 mm. in diameter, 150 mm. in length, was filled three inches high with catalyzed resin and inserted into a 150° F. water bath. The resin was then stirred with a wire loop. The time from insertion of the test tube until the resin gelled is the gel time. The cure time and the peak exotherm were determined by placing a test tube as described above with three inches of resin into a 150° F. water bath. A thermocouple connected to a temperature recorder was inserted 1½ inches deep into the resin. The time from inserting the test tube into the water bath to reaching peak exotherm was the total cure time.

Table II

EFFECTIVENESS OF 2-MERCAPTO THIAZOLINE ON AN UNPIGMENTED RESIN AND COMPARISON WITH OTHER NITROGEN-SULFUR COMPOUNDS

| Additive | Gel Time | Total Cure Time | Peak Exotherm, °F. | Color of Cured Resins |
|---|---|---|---|---|
| 0.02% 2-mercaptothiazoline | 3 min., 45 sec | 15 min., 45 sec | 209 | water-white. |
| 0.02% 2-amino-benzene thiol | 1 min., 30 sec | 10 min., 30 sec | 153 | brown discolor. |
| 0.02% dibutyl-thiourea | 22 min | 34 min., 30 sec | 165 | water white. |
| 0.02% ethylenethiourea | 7 min | 15 min., 20 sec | 194 | Do. |
| None | 40 min | 52 min | 159 | Do. |

The results compiled in Table II show that 2-mercapto thiazoline is a much more powerful promoter than dibutyl thiourea and ethylene thiourea. The 2-amino-benzenethiol imparts a shorter gel time, but, on the other hand, gives rise to discoloration and also imparts poor storage stability (Table I).

(3) To show the effect of 2-mercapto thiazoline, as compared with similar compounds, on the gelling and curing behavior of a pimented resin, the same procedure as described above was employed.

90 parts of resin as described under "Resin Preparation" were mixed with 10 parts of methyl methacrylate, 0.2 part of a 50% paste of Pittsburh Yellow (cadmium sulfide), 0.5 part of benzoyl peroxide, and 0.5 part of cumene hydroperoxide. This base resin was checked as is, and in connection with various promoters (Table III).

Table III
EFFECTIVENESS OF 2-MERCAPTO THIAZOLINE IN A PIGMENTED RESIN

| Promoter | Gel Time | Total Cure Time | Peak Exotherm, °F. | Appearance Cured Res. |
|---|---|---|---|---|
| None | 85 min | 97 min., 30 sec | 160 | No discoloration. |
| 0.02% 2-mercapto thiazoline | 3 min., 40 sec | 26 min., 45 sec | 172 | Do. |
| 0.02% 2-amino-benzenethiol | 5 min., 30 sec | 13 min., 30 sec | 157 | Discoloration. |
| 0.02% dibutyl thiourea | 33 min., 15 sec | 49 min., 38 sec | 178 | No discoloration. |
| 0.02% ethylene thiourea | 4 min., 45 sec | 17 min., 45 sec | 163 | Do. |
| 0.04% ethylene thiourea | 5 min., 35 sec | 15 min., 35 sec | 160 | Do. |

It follows from Table III that 2-mercapto thiazoline imparts the shortest gel time to a resin. Furthermore, a comparison with Table II teaches that it is vertually unaffected by pigments which have a retarding effect, namely, 3 min. 45 sec. gel time of the unpigmented resin (Table II) versus 3 min. 40 sec. gel time of the pigmented resin (Table III). It is to be noted that the other promoters show a rather erratic behavior, for instance, ethylene thiourea-containing resin having a gel time of 7 min. when unpigmented versus 4 min. 45 sec. when pigmented. Dibutyl thiourea (22 min. versus 33 min.) and 2-amino benzenethiol (1 min. 30 sec. versus 5 min. 30 sec.) also show this irregularity.

(4) The influence of various pigments on a resin promoted with mercapto thiazoline was checked, and the results were compiled in Table IV. The procedure described above was employed also in these tests.

For comparison, a resin containing various pigments and a conventional promoter, namely, a tertiary amine and a quaternary ammonium salt was also checked and the data listed in Table IV.

The resin promoted with 2-mercapto thiazoline was called Resin I. It consists of 83.3 parts of resin described under "Resin Preparation," 16.7 parts styrene, 0.2 part 10 percent solution of 2-mercapto thiazoline in diethylene glycol, 0.00116 part copper naphthenate containing 8 parcent metal, 0.5 part benzoyl peroxide and 0.5 part cumene hydroperoxide.

The resin promoted with a tertiary amine and a quaternary ammonium salt was called Resin 2. It consists of 83.3 parts of resin described under "Resin Preparation," 16.7 parts styrene, 0.25 part of a mixture of 6.67 percent choline chloride, 20.33 percent dodecyl dimethyl amine, and 66.0 percent benzyl alcohol as a solvent; 0.5 part benzoyl peroxide and 0.5 percent cumene hydroperoxide.

The gelling and curing behaviors were determined by the method described above.

Table IV
PROMOTING AND EQUALIZING EFFECT OF 2-MERCAPTO THIAZOLINE ON A PIGMENTED RESIN

| | Blank | 0.2 Percent Cadmium Sulfide Paste (50 Percent) | 0.2 Percent Phthalocyanine Green Paste (50 Percent) | 0.2 Percent Black Paste (50 Percent) | 0.2 Percent Cadmium Red Paste (50 Percent) | 0.2 Percent Titanium Dioxide White Paste (50 Percent) |
|---|---|---|---|---|---|---|
| Resin 1 (with 2-mercapto thiazoline): | | | | | | |
| Gel Time | 3 min., 55 sec. | 3 min., 45 sec. | 3 min., 45 sec. | 3 min., 20 sec. | 3 min., 30 sec. | 4 min., 15 sec. |
| Cure Time | 9 min., 20 sec. | 9 min., 25 sec. | 8 min., 20 sec. | 9 min., 20 sec. | 9 min., 10 sec. | 9 min., 45 sec. |
| Peak Exotherm | 338° F. | 324° F. | 347° F. | 346° F. | 335° F. | 336° F. |
| Resin 2 (with amine and quaternary ammonium salt): | | | | | | |
| Gel Time | 8 min., 10 sec. | 42 min. | 13 min., 15 sec. | 7 min., 15 sec. | 28 min., 15 sec. | 9 min., 5 sec. |
| Cure Time | 16 min., 40 sec. | 56 min., 30 sec. | 24 min., 45 sec. | 16 min. | 47 min. | 18 min., 10 sec. |
| Peak Exotherm | 295° F. | 173° F. | 244° F. | 277° F. | 190° F. | 292° F. |

Table IV demonstrates the superior characteristics of a resin promoted with 2-mercapto thiazoline. Whether the resin is used with or without pigments, the gel times remain substantially unchanged. Contrastingly, a resin promoted with a conventional promotor comprising a tertiary amine and a quaternary ammonium salt is very sensitive toward the action of a great deal of pigments.

We claim:

1. A stable promoted resin composition having uniform gelling and curing characteristics which comprises a copolymerizable mixture of (A) at least one liquid, polymerizable, ethylenically unsaturated monomer having an initial boiling point above about 60° C., (B) at least one linear, unsaturated polyester of an aliphatic dihydric alcohol and an alpha-beta ethyienically unsaturated dicarboxylic acid, and an effective amount of a gel promoter comprising 2-mercapto thiazoline.

2. A resin composition as set forth in claim 1, wherein the unsaturated monomer is styrene.

3. A resin composition as set forth in claim 1 and a polymerization catalyst comprising an organic peroxide.

4. A composition as set forth in claim 3, wherein the peroxide catalyst comprises a mixture of benzoyl peroxide and cumene hydroperoxide.

5. A new compositon of matter comprising a copolymerizable blend of (A) a miscible polymerizable vinyl monomer, (B) an unsaturated polyester alkyd resin of saturated dihydric alcohols and alpha-beta ethylenically unsaturated dicarboxylic acids, and between about 0.001 and 0.1 percent by weight, based on the combined weight of A and B, of dissolved 2-mercapto thiazoline.

6. A stable pigmented resinous composition having uniform gelling and curing characteristics comprising a copolymerizable mixture of (A) a liquid polymerizable monomeric compound containing at least one carbon-to-carbon double bond, (B) a linear unsaturated polyester having an acid number of about 60 or below, of aliphatic saturated dihydric alcohols and unsaturated dicarboxylic acids which contain a carbon-to-carbon double bond conjugated to either one of the carbon-to-oxygen double bonds of the carboxyl groups, and an effectively promoting amount of 2-mercapto thiazoline.

7. A stable, pigmented resin composition of uniform gelling and curing characteristics comprising a copolymerizable mixture of (A) a liquid, polymerizable monomer containing at least one $>C=CH_2$ group, (B) an unsaturated polyester alkyd resin having an acid number of about 45 or below, of aliphatic saturated dihydric alcohols and alpha-beta ethylenically unsaturated dicarboxylic acids; a small, effectively promoting amount of 2-mercapto thiazoline; and a minor amount of pigment which is a member of the group consisting of inorganic and organic pigments.

8. A method of overcoming retarded polymerization of pigmented unsaturated polyester resins comprising a polymerizable blend of (A) a linear unsaturated polyester alkyd resin of aliphatic dihydric alcohols, and alpha-beta ethylenically unsaturated dicarboxylic acids, and (B) polymerizable, ethylenically unsaturated monomers having at least one $>C=CH_2$ group; a minor amount of a pigment being a member of the group consisting of inorganic and organic pigments, said method being characterized by incorporating into said blend a small, effectively promoting amount of 2-mercapto thiazoline, and thereafter admixing an organic peroxide polymerization catalyst.

9. A method of claim 8 wherein the amount of 2-mercapto thiazoline is between about 0.001 and about 0.1 percent by weight, based on the combined weight of (A) and (B).

10. As a new method of imparting uniform gelling characteristics to a pigmented polymerizable mixture of (A) miscible liquid vinyl monomers, (B) an unsaturated polyester of an aliphatic glycol free from functional groups other than hydroxyls, and alpha-beta ethylenically unsaturated dicarboxylic acids, said mixture of (A) and (B) further containing a minor amount of a color pigment dispersed therein, the addition of a small, effectively promoting amount of dissolved 2-mercapto thiazoline.

11. A pigmented laminate made by impregnating fibrous materials with a copolymerizable mixture of (A) liquid, polymerizable, ethylenically unsaturated monomers, (B) linear, unsaturated polyesters of aliphatic, saturated dihydric alcohols, and alpha-beta ethylenically unsaturated dicarboxylic acids; a small, effectively promoting amount of 2-mercapto thiazoline, a minor amount of a color pigment, and a small effective amount of a polymerization catalyst of the peroxide type, and hardening the impregnated fibrous material at room to elevated temperatures.

References Cited in the file of this patent

UNITED STATES PATENTS

| | | |
|---|---|---|
| 2,830,966 | Petropoulos | Apr. 15, 1958 |
| 2,871,420 | Minter et al. | Jan. 27, 1959 |